United States Patent [19]

Hixenbaugh et al.

[11] 4,410,166

[45] Oct. 18, 1983

[54] GAS COLLECTOR FOR METALLURGICAL VESSELS

[75] Inventors: Dennis L. Hixenbaugh; Peter G. A. Brand; Edward J. Straka, all of Pittsburgh, Pa.

[73] Assignee: Pennsylvania Engineering Corporation, Pittsburgh, Pa.

[21] Appl. No.: 329,250

[22] Filed: Dec. 10, 1981

[51] Int. Cl.³ .......................... C21B 11/10; C21C 5/38
[52] U.S. Cl. ................................. 266/158; 98/115 R; 98/115 VM; 373/9; 373/79
[58] Field of Search ..... 266/158; 98/115 R, 115 VM; 373/9, 79

[56] References Cited

U.S. PATENT DOCUMENTS

| | | | |
|---|---|---|---|
| 3,834,293 | 9/1974 | Danieli | 266/158 |
| 4,126,300 | 11/1978 | Oberhelman | 266/158 |
| 4,177,975 | 12/1979 | Meyers et al. | 266/158 |
| 4,234,170 | 11/1980 | Suitlas | 266/158 |

FOREIGN PATENT DOCUMENTS

| | | | |
|---|---|---|---|
| 2921880 | 12/1980 | Fed. Rep. of Germany | 266/158 |
| 51-2882 | 1/1976 | Japan | 266/158 |

Primary Examiner—Michael L. Lewis
Attorney, Agent, or Firm—Fred Wiviott

[57] ABSTRACT

An enclosure for a metallurgical vessel has a front access door to permit movement of charging devices into the enclosure for charging the metallurgical vessel disposed therein. A gas collector is mounted in the upper end of the enclosure, a first hood mounted in the enclosure for movement between an operative position above the vessel and an inoperative position remote from the vessel. When in its operative position, the hood is disposed in coupling engagement with one side of the gas collector. A second hood is fixedly coupled to the other side of the gas collector. Dampers are disposed between each hood and the gas collector.

3 Claims, 3 Drawing Figures

GAS COLLECTOR FOR METALLURGICAL VESSELS

BACKGROUND OF THE INVENTION

This invention relates to enclosures for metallurgical vessels and more particularly to gas collectors for such enclosures.

Metallurgical vessels, such as electric arc furnaces, are commonly disposed within enclosures for pollution control and noise abatement. Toward this end, such enclosures are also provided with exhaust hoods for collecting gases which escape from the vessel. In order to permit the vessel to be charged with the metals being processed and other materials necessary for the metallurgical process, such enclosures are also generally provided with access doors. Charging is normally accomplished by charging ladels which are suspended for movement into and out of the enclosure by overhead cranes. As a result, the gas collecting hoods of such enclosures must be located to one side of the transit path of the charging ladle and its supporting cables. One such enclosure is disclosed in U.S. Pat. No. 4,160,117.

SUMMARY OF THE INVENTION

It is an object of the invention to provide a new and improved enclosure for electric arc furnaces.

Another object of the invention is to provide a gas collecting hood for metallurgical vessel enclosures which is effectively positioned during vessel operation but which does not inhibit movement of charging cranes into and out of the enclosure.

A further object of the invention is to provide a gas collecting hood for metallurgical vessel enclosures which is effectively positioned for collecting gases escaping from the vessel but which does not inhibit elevation of the electrodes when the vessel roof is swung for changing or for electrode repair or replacement.

These and other objects and advantages of the present invention will become more apparent from the detailed description thereof taken with the accompanying drawings.

In general terms, the invention comprises an enclosure for surrounding a metallurgical vessel and having an access door to permit movement of charging apparatus into and out of the enclosure for charging the vessel disposed therein, a gas collecting hood mounted in the enclosure for horizontal movement from a position generally above said vessel to a remote position, a stationary gas collector disposed within said enclosure for conducting polluting gases therefrom, and means for connecting and disconnecting said hood to said duct when said hood is positioned above said vessel.

DESCRIPTION OF THE PREFERRED EMBODIMENT

Figure 1:
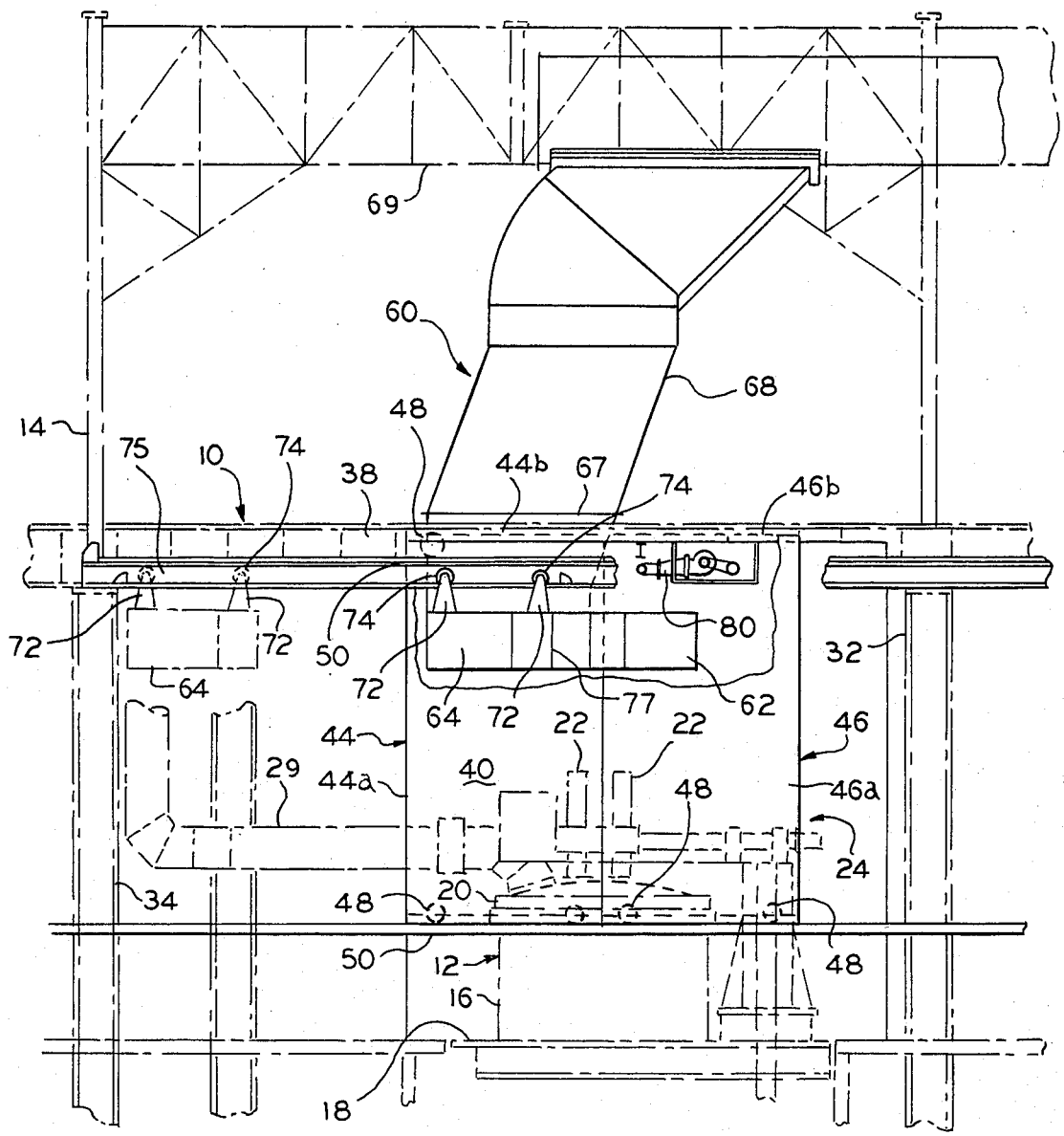
FIG. 1 is a front sectional view of the enclosure according to the invention.

FIG. 1 shows an enclosure 10 according to the invention for enclosing a metallurgical vessel, such as an electric arc furnace 12. The enclosure 10 is preferably disposed within a larger building symbolized by support columns 14.

The electric arc furnace may be of a conventional type and including a furnace body 16 mounted on a tilting platform 18, a furnace roof 20 and a plurality of electrodes 22 which extend through suitable openings in roof 20. It will be understood that the furnace body 16 is generally hollow and circular in plan view, and includes a refractory lining (not shown) and a metallic outer shell. The roof 20 is coupled to an elevating and translating assembly (not shown) for raising the roof 20 and the electrodes 22 from the furnace body 16 and for swinging the same from a position shown in FIG. 1 to a position shown by broken lines in FIG. 2 so that the vessel may be charged. A roof elevating and transporting assembly may be of any conventional type, such as that shown in U.S. Pat. No. 4,160,117. Additionally, an electrode positioning assembly 24 is coupled to the electrodes 22 for support and positioning of the electrodes relative to the charge in furnace 12. It will also be appreciated by those skilled in the art that the platform 18 may be mounted on a suitable rocker assembly so that the furnace 12 may be tilted to discharge the metal being treated into a ladle 25 carried by a ladle car 26 which is disposed on tracks 27 provided in a trench 28 which extends adjacent the furnace 12. A gas collector 29 may be coupled to an opening in the furnace roof for removing the main portion of the gases generated in the vessel 10.

The enclosure 10 is a generally box-like structure and includes a front wall 30, side walls 32 and 34, a rear wall 36 and a roof 38. The walls 30, 32 and 34 and the roof 38 are fabricated of suitable structural members in a manner well known in the art and will, accordingly, not be discussed in the detail. An opening 40 is formed in the front central portion of the front wall 30 and the corresponding portion of the roof 38 and defines an access area generally above the furnace 12. This permits the furnace 12 to be charged, such as, for example, by means of a charging ladle 42 which may be supported from an overhead crane (not shown) by hooks 43 for movement into and out of the enclosure 10 and through the opening 40. A pair of doors 44 and 46 having an inverted L-shaped configuration are mounted for rolling movement in opposite directions for covering and uncovering the opening 40. In particular, the doors respectively include front panels 44a and 46a and top panels 44b and 46b and each door is supported by means of suitably journaled rollers 48 mounted in spaced apart relation on each door and engaging the upper flanges of I-beams 50 extending parallel to the front wall 30 and which form a part of the framework for enclosure 10 and act as rails for rollers 48.

Figure 2:
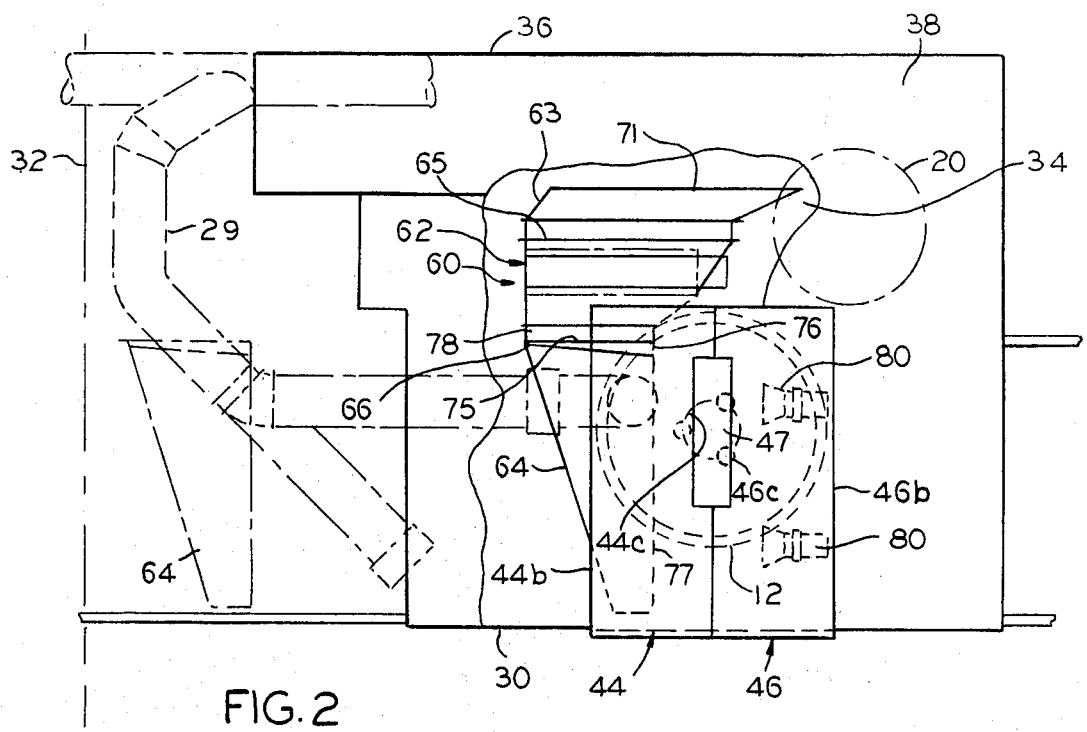
FIG. 2 is a top plan view of the enclosure of FIG. 1 with parts broken away.
Figure 3:
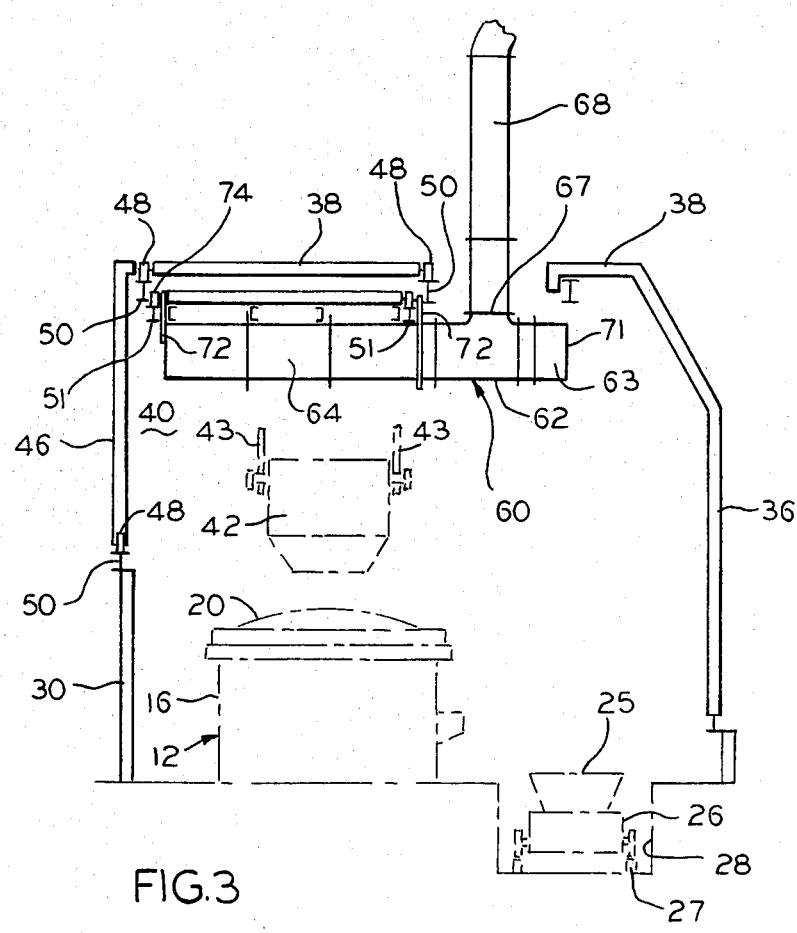
FIG. 3 is an end view with parts broken away of the enclosure illustrated in FIG. 1.

As seen in FIG. 2, the proximate ends of the door panels 44b and 46b are each provided with a recess 44c and 46c, respectively, to define an opening 47 which permit suspension hooks 43 or cables which support the ladle 42 to pass therethrough so that the doors 44 and 46 may be closed while the ladle 42 is within the enclosure 10.

An evacuation system 60 for enclosure 10 is shown to include a stationary gas intake 62 suitably supported in the upper end of the enclosure above and to one side of the furnace 10; a first gas collecting hood 63 mounted adjacent the one end of intake 62; and a second gas collecting hood 64 mounted for movement into and out of coupling engagement with one end of intake 62. The gas intake 62 comprises a generally hollow housing which is tapered in plan view and has inlet openings 65 and 66, respectively, facing toward the rear and front walls of enclosure 10. In addition, the intake 62 has an outlet 67 formed centrally in its upper portion and which is connected by a conduit 68 to a main exhaust duct 69 which may service a plurality of enclosures. An exhaust fan (not shown), may be coupled to conduit 69 for creating a suction therein. Duct 29 may also be connected to the main exhaust duct 69.

The first gas collecting hood 63 is coupled at one end to the inlet 65 and flares outwardly to an opening 71 facing the rear wall 36. A damper is disposed in the gas collector 62 and adjacent the inlet 65 to permit closing or selective adjustment of the inlet opening.

The second gas collecting hood 64 is mounted adjacent the narrow end of housing 62 for movement in a direction generally parallel to the front wall 30. Hood 64 is generally wedge-shaped in plan view and rectangular in any vertical section. Extending upwardly from hood 64 are a plurality of bracket members 72, each of which is provided with a roller 74 for engaging a lower flanges of one of a pair of spaced apart beams 50 which form a part of the framework of enclosure 10. This permits movement of the hood 64 between an operated position adjacent the inlet 66 and generally above the furnace 12 to a remote position shown by broken lines in FIGS. 1 and 2 wherein the area above the furnace is clear for furnace charging or maintenance. In order to improve the coupling between the hood 64 and the intake 62, the end 75 of the hood 70 may be tapered and a complimentary tapered wedge-shaped duct 76 may be disposed between the end 75 and the body 62. The hood 64 also has an opening 77 formed in the side thereof which faces the area above the furnace 12. Additionally, a damper is disposed in a narrow end of intake 62 to restrict or terminate the flow of gas through hood 64.

As seen in FIGS. 1 and 2, a pair of air curtain blowers 80 are suitably mounted below roof 38 for projecting an air curtain toward the area immediately below the opening 47 defined by the roof panel recesses 44c and 46c and generally toward the opening 77 in hood 64.

In operation, the hood 64 is normally moved to its remote location shown by broken lines in FIGS. 1 and 2 and the doors 44 and 46 are open to permit a charging ladle 42 to be moved into the enclosure. The doors 44 and 46 may then be closed and the hood 64 moved into its operative position for collecting gases during the charging operation. During this time also, the air curtain blowers 80 will be actuated to direct a curtain of air across the opening 47 which acts as a seal for said opening in a manner well known in the art. This air curtain action is facilitated because the blowers 80 face the opening 77 in hood 64 to enhance the flow of air across the opening 47.

After the charging operation has been completed, the hood 64 is again moved to its remote position and the doors are open for removing the ladle 42. The furnace roof and electrodes are then swung to a position above the furnace body 16, the doors 44 and 46 are closed and the hood 64 returned to its operative position shown by full lines. At this time, the damper 65 is closed while the damper 66 remains open so that exhaust gases which escape the furnace 12 will safely be collected.

At the completion of a furnace melting or processing operation, it is necessary to discharge the molten metal from the furnace into the ladle 25. As the platform 18 is tilted toward the right as viewed in FIG. 2, the pouring operation will commence. In order to facilitate the collecting of gases discharged during a pouring operation, the damper 78 is closed and the damper 65 is open so that gases from the furnace pouring spout and the ladle will flow upwardly to the hood 63.

While only a single embodiment of the invention has been illustrated and described, it is not intended to be limited thereby but only by the scope of the appended claims.

I claim:

1. An enclosure for a metalurigical vessel, said enclosure having side walls, an upper end and a door for providing access to the interior of said enclosure,
    gas collecting means disposed adjacent the upper end of said enclosure and including a stationary gas collecting portion having first and second spaced apart inlets and an outlet,
    a generally elongated gas collecting hood mounted for movement within said enclosure and between a remote position therein and an operative position generally above and to one side of said metallurgical vessel,
    coupling means for coupling said hood to said first inlet when said hood is in its operative position,
    said hood extending generally horizontally from said first inlet and to a position generally above and to another side of said vessel and having an opening formed in one side thereof;
    and said side facing generally horizontally and toward the area above said vessel,
    said stationary gas collecting portion being located above and to one side of said vessel,
    a second hood fixedly mounted on said gas collecting portion and communicating with the second inlet.

2. The combination set forth in claim 1 wherein said door has a recess formed therein to define an aperture generally located above said vessel when said doors are in their closed position, the opening in said elongated gas collecting hood facing said aperture, and air curtain blower means disposed within said enclosure adjacent and opposite of said opening for directing an air curtain toward the opening in said hood.

3. The combination set forth in claim 1 wherein first and second damper means are provided respectively between each of said first and second hoods and said gas collecting portion.

* * * * *